(12) United States Patent
Anchan

(10) Patent No.: US 8,891,739 B2
(45) Date of Patent: Nov. 18, 2014

(54) APPARATUS AND METHOD FOR PERFORMING PRECOGNITIVE LAWFUL INTERCEPT IN GROUP CALLS

(75) Inventor: Kirankumar Anchan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 13/274,892

(22) Filed: Oct. 17, 2011

(65) Prior Publication Data

US 2013/0094638 A1  Apr. 18, 2013

(51) Int. Cl.
*H04M 1/64* (2006.01)
*H04M 3/22* (2006.01)

(52) U.S. Cl.
CPC .... *H04M 3/2281* (2013.01); *H04M 2203/2044* (2013.01)
USPC .................. 379/70; 370/260; 379/35; 379/38; 379/85; 455/414.1

(58) Field of Classification Search
CPC ................. H04M 3/08; H04M 3/229; H04M 2203/2044; H04M 1/253; H04M 1/2535; H04M 1/66; H04M 3/42348; H04M 3/42357; H04M 3/56; H04M 7/0024–7/006; H04M 15/04; H04M 15/06; H04M 2001/26; H04M 2001/27; H04M 2203/30; H04M 2203/301; H04M 2203/303; H04M 2203/351; H04M 2203/50; H04M 2203/60–2203/609; H04M 2203/654; H04M 3/2281; H04L 12/2602; H04L 12/2618; H04L 26/39; H04L 43/04–43/067; H04L 63/30–63/308; H04L 65/4061; H04W 4/10; H04W 12/02; H04Q 2213/1324; H04Q 2213/3288

USPC .................... 348/14.01–14.16; 370/259–271, 370/351–357; 455/412.1–426.2, 455/456.1–466, 550.1–560, 575.1–575.9, 455/90.1–90.3; 704/270–278; 709/201–207, 217–248; 379/37–51, 379/67.1–88.28
See application file for complete search history.

(56) References Cited

U.S. PATENT DOCUMENTS

| 7,155,207 | B2 | 12/2006 | Chapman et al. |
| 7,415,099 | B2 | 8/2008 | Qian et al. |
| 7,535,993 | B2 * | 5/2009 | Cai et al. .......................... 379/45 |
| 8,031,849 | B1 * | 10/2011 | Apple et al. ..................... 379/145 |
| 2006/0285649 | A1 * | 12/2006 | Qian et al. ................. 379/32.01 |
| 2007/0155415 | A1 * | 7/2007 | Sheehy et al. ................ 455/518 |
| 2008/0244702 | A1 | 10/2008 | Kropivny |
| 2009/0088139 | A1 * | 4/2009 | Deubler et al. ............. 455/414.3 |
| 2009/0262723 | A1 | 10/2009 | Pelletier et al. |
| 2010/0235453 | A1 * | 9/2010 | Attanasio et al. ............ 709/206 |
| 2011/0153809 | A1 * | 6/2011 | Ghanem et al. ............... 709/224 |

FOREIGN PATENT DOCUMENTS

| WO | 2004107719 A1 | 12/2004 |
| WO | 2006111357 A1 | 10/2006 |

OTHER PUBLICATIONS

International Search Report and Written Opinion—PCT/US2012/060456—ISA/EPO—Dec. 21, 2012.

* cited by examiner

*Primary Examiner* — Hemant Patel
(74) *Attorney, Agent, or Firm* — Raphael Freiwirth

(57) ABSTRACT

A method and apparatus for performing lawful intercept in a group call is described. A group call for is established and at least one target member device of the group call is identified as corresponding to a subject to be tracked. Call content for communications corresponding to the call is then tracked from the beginning of the call. A query is presented to a law enforcement authority to determine whether the law enforcement authority wishes to receive call data collected before the target joined the call or after the target leaves the call.

40 Claims, 12 Drawing Sheets

US 8,891,739 B2

APPARATUS AND METHOD FOR PERFORMING PRECOGNITIVE LAWFUL INTERCEPT IN GROUP CALLS

BACKGROUND

This application relates generally to lawful intercept, and more particularly, to performing near-real-time monitoring and reporting of intercepted communications in a group call setting.

The Communications Assistance for Law Enforcement Act (CALEA) is a United States wiretapping law to aid law enforcement in its effort to conduct criminal investigations requiring wiretapping of digital telephone networks. Existing implementations of a CALEA system typically only handle one-to-one calls, and do not work for group communications such as push-to-talk (PTT) and VoIP communications. Moreover, existing implementations deliver call signaling and call media (voice content) to the Law Enforcement Authority (LEA) across different paths, which often results in receiving this content at different times, making it difficult or impossible to correlate. Further, the different network components required for delivering the call signaling and call media provide opportunities for such components to be bypassed by custom VoIP solutions, as well as providing complications and cost in scaling.

Additionally, some of the existing implementations rely of out of band signaling, like SMS, to provide location information corresponding to the call signaling and media. This out of band signaling may be detected by the end user, which is not desirable. Moreover, the use of best effort, out of band signaling (e.g., SMS) on a different physical layer than the PTT/VoIP signaling (e.g., 1× vs DoRA) does not guarantee the delivery of the out of band location information. Further, the device user may be able to shut it off the SMS or other location based service. Other implementations rely on the Network (e.g., RAN, Core Network) to extract the location information for specific application services, however, such functionality may not be universally available. Thus, existing CALEA implementations have many drawbacks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with some aspects, a method of reporting call information in a group communication call comprises establishing a group communication call for a call group having a plurality of member devices; identifying at least one target member device of the plurality of member devices as corresponding to a subject to be tracked; storing, starting from the beginning of the group communication call, call content for communications corresponding to the group call; determining that the at least one target member device has joined the group call; forwarding at least one query, based on the at least one target member device joining the call, to determine if a law enforcement agency desires information relating to the group call obtained before the at least one target member device joined the call or after the at least one target member device has left the call; receiving a response to the at least one query; and managing the stored call content based on the response.

In accordance with some aspects, a network apparatus for reporting call information in a group communication call comprises a group communication setup component configured to establish a group communication call for a call group having a plurality of member devices, and a call intercept component configured to identify at least one target member device of the plurality of member devices as corresponding to a subject to be tracked; store, starting from the beginning of the group communication call, call content for communications corresponding to the call; determine that the at least one target member device has joined the group call; forward a query, based on the at least one target member device joining the call, to determine if a law enforcement agency desires information relating to the group call obtained before the at least one target member device joined the group call or after the at least one target member device has left the group call; receive a response to the query; and manage the stored call content based on the response.

In accordance with some aspects, at least one processor configured to report call information in a group communication call comprises a first module for establishing a group communication call for a call group having a plurality of member devices; a second module for identifying at least one target member device of the plurality of member devices as corresponding to a subject to be tracked; a third module for storing, starting from the beginning of the group communication call, call content for communications corresponding to the group call; a fourth module for determining that the at least one target member device has joined the group call; a fifth module for forwarding at least one query, based on the at least one target member device joining the call, to determine if a law enforcement agency desires information relating to the group call obtained before the at least one target member device joined the call or after the at least one target member device has left the call; a sixth module for receiving a response to the at least one query; and a seventh module for managing the stored call content based on the response.

In accordance with some aspects, a computer program product comprises a computer-readable medium comprising a first set of codes for causing a computer to establish a group communication call for a call group having a plurality of member devices; a second set of codes for causing the computer to identify at least one target member device of the plurality of member devices as corresponding to a subject to be tracked; a third set of codes for causing the computer to store, starting from the beginning of the group communication call, call content for communications corresponding to the group call; a fourth set of codes for causing the computer to determine that the at least one target member device has joined the group call; a fifth set of codes for causing the computer to forward at least one query, based on the at least one target member device joining the call, to determine if a law enforcement agency desires information relating to the group call obtained before the at least one target member device joined the call or after the at least one target member device has left the call; a sixth set of codes for causing the computer to receive a response to the at least one query; and a seventh set of codes for causing the computer to manage the stored call content based on the response.

In accordance with some aspects, an apparatus comprises means for establishing a group communication call for a call group having a plurality of member devices; means for identifying at least one target member device of the plurality of member devices as corresponding to a subject to be tracked;

means for storing, starting from the beginning of the group communication call, call content for communications corresponding to the group call; means for determining that the at least one target member device has joined the group call; means for forwarding at least one query, based on the at least one target member device joining the call, to determine if a law enforcement agency desires information relating to the group call obtained before the at least one target member device joined the call or after the at least one target member device has left the call; means for receiving a response to the at least one query; and means for managing the stored call content based on the response.

In accordance with some aspects, a method for reporting call information in a group communication call comprises establishing a group communication call for a call group having a plurality of member devices; determining, based on call history, that a target device is likely to join the group communication call, wherein the target device is not a member of the call group; determining to store call content for communication corresponding to the group call, based in part on the determination that the target device is likely to join the group communication call; storing, starting from the beginning of the group communication call, call content for communications corresponding to the group call; determining that the target device has joined the group call; forwarding at least one query, based on the target device joining the call, to determine if a law enforcement agency desires information relating to the group call obtained before the target device joined the call or after the target member device has left the call; receiving a response to the at least one query; and managing the stored call content based on the response.

In accordance with some aspects, an apparatus for reporting call information in a group communications call comprises a group communication setup component configured to establish a call group having a plurality member devices; and a call intercept component configured to determine, based on call history, that a target device is likely to join the group communication call, wherein the target device is not a member of the call group; determine to store call content for communication corresponding to the group call, based in part on the determination that the target device is likely to join the group communication call; store, starting from the beginning of the group communication call, call content for communications corresponding to the group call; determine that the target device has joined the group call; forward at least one query, based on the target device joining the call, to determine if a law enforcement agency desires information relating to the group call obtained before the target device joined the call or after the target member device has left the call; receive a response to the at least one query; and manage the stored call content based on the response.

In accordance with some aspects, at least one processor configured to report call information in a group communication call comprises a first module for establishing a group communication call for a call group having a plurality of member devices; a second module for determining, based on call history, that a target device is likely to join the group communication call, wherein the target device is not a member of the call group; a third module for determining to store call content for communication corresponding to the group call, based in part on the determination that the target device is likely to join the group communication call; a fourth module for storing, starting from the beginning of the group communication call, call content for communications corresponding to the group call; a fifth module for determining that the target device has joined the group call; a sixth module for forwarding at least one query, based on the target device joining the call, to determine if a law enforcement agency desires information relating to the group call obtained before the target device joined the call or after the target member device has left the call; a seventh module for receiving a response to the at least one query; and an eighth module for managing the stored call content based on the response.

In accordance with some aspects, a computer program product comprises a computer-readable medium comprising a first set of codes for causing a computer to establish a group communication call for a call group having a plurality of member devices; a second set of codes for causing the computer to determine, based on call history, that a target device is likely to join the group communication call, wherein the target device is not a member of the call group; a third set of codes for causing the computer to determine to store call content for communication corresponding to the group call, based in part on the determination that the target device is likely to join the group communication call; a fourth set of codes for causing the computer to store, starting from the beginning of the group communication call, call content for communications corresponding to the group call; a fifth set of codes for causing the computer to determine that the target device has joined the group call; a sixth set of codes for causing the computer to forward at least one query, based on the target device joining the call, to determine if a law enforcement agency desires information relating to the group call obtained before the target device joined the call or after the target member device has left the call; a seventh set of codes for causing the computer to receive a response to the at least one query; and an eighth set of codes for causing the computer to manage the stored call content based on the response.

In accordance with some aspects, an apparatus comprises means for establishing a group communication call for a call group having a plurality of member devices; means for determining, based on call history, that a target device is likely to join the group communication call, wherein the target device is not a member of the call group; means for determining to store call content for communication corresponding to the group call, based in part on the determination that the target device is likely to join the group communication call; means for storing, starting from the beginning of the group communication call, call content for communications corresponding to the group call; means for determining that the target device has joined the group call; means for forwarding at least one query, based on the target device joining the call, to determine if a law enforcement agency desires information relating to the group call obtained before the target device joined the call or after the target member device has left the call; means for receiving a response to the at least one query; and means for managing the stored call content based on the response.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The apparatus and methods described herein enable lawful monitoring of targeted devices in a group call setting. When a group call is initiated having a target as a member of the group, the collection of call signaling and voice communications begins. The law enforcement authority receives intercepted voice communications and other data in or near real-time. The system enables a law enforcement authority to determine whether or not it wishes to receive data obtained before a target joins a call and/or after the target leaves the call. Moreover, in addition to signaling and data related to the actual voice communications, data related to applications accessed on a wireless device while participating in a group call may be intercepted and provided to the law enforcement authority.

Figure 1:
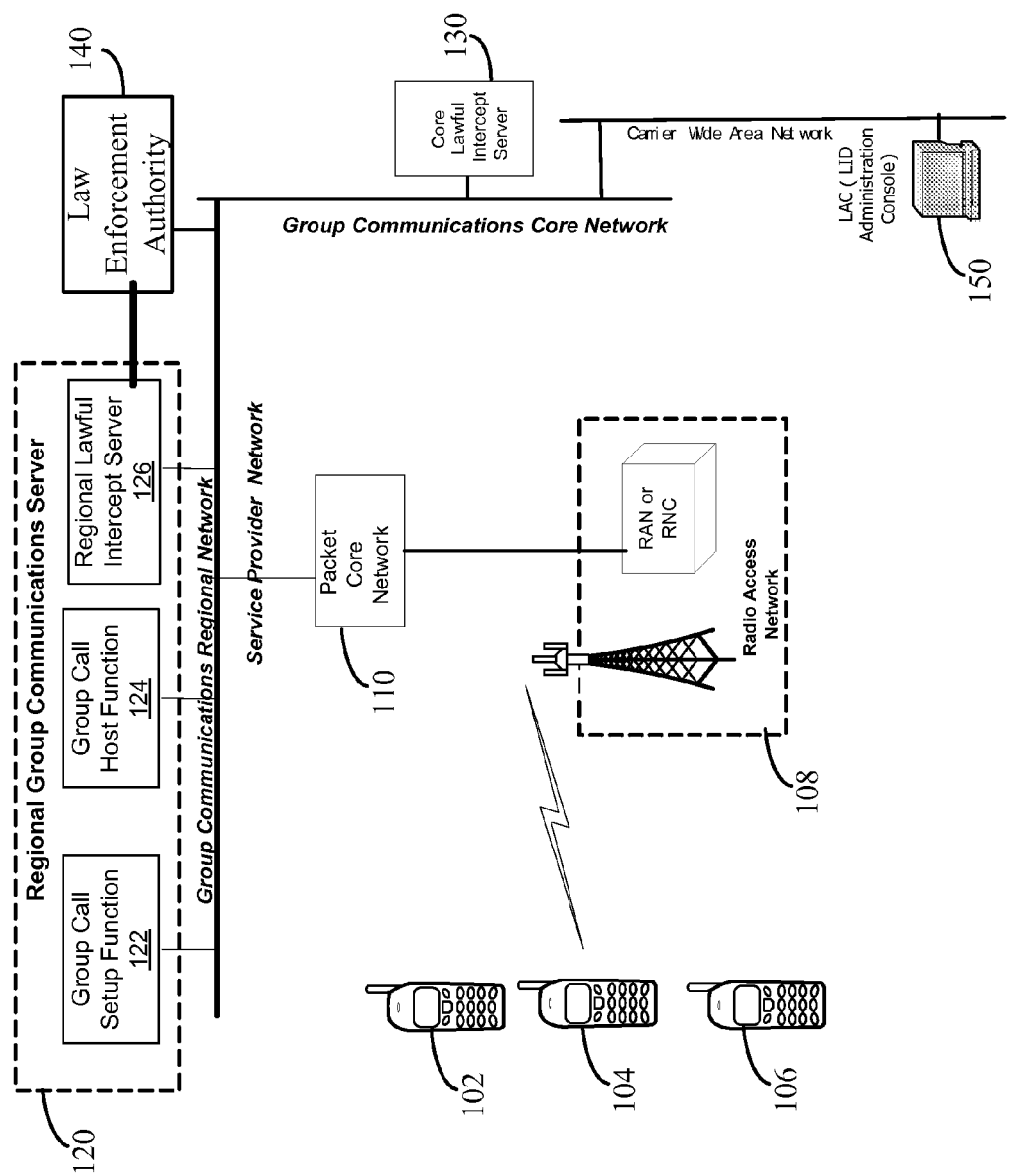
FIG. 1 depicts a group communication system, in accordance with some disclosed aspects.

FIG. 1 is a block diagram illustrating a group communication system 100 configured for providing lawful intercept services. As shown in FIG. 1, a plurality of wireless devices 102, 104, and 106 form a group capable of engaging in a group communication session. Wireless devices 102, 104, and 106 may communicate over radio access network 108, which is coupled to packet core network 110. To provide lawful intercept services, group communication system 100 includes one or more regional group communications servers 120, a core lawful intercept server 130, one or more law enforcement authorities (LEAs) 140, and one or more lawful intercept definition (LID) administration consoles (LACs) 150.

LACs 150 may be configured to provision lawful intercept definitions for targets to be monitored. This may include, for example, providing a target name, mobile telephone number, mobile address, and/or other identifying information. In some aspects, targets may be associated with a priority level that indicates the importance of the target. For example, a target that is on a national or international "most wanted" list may be assigned the highest priority, while a local criminal may have a lower priority. Provisioning the lawful intercept definitions for targets to be monitored may include providing the priority level associated with the target to a lawful intercept server. Identifying information for targets may be provided to core lawful intercept server 130, which may determine which regional group communication server 120 is responsible for monitoring each target. That is, a regional group communication server 120 may serve as a monitoring component. Each LID administrator console 150 may be associated with a LEA 140 that is configured to receive lawful intercept messages and data. In some aspects, LEA 140 may be added as a member of a group call without knowledge of the other members of the group call. As such, LEA 140 receives the voice content exchanged during the call in real-time or near real-time, as well as other group call-related information.

When a wireless device commences a group call, the call may be intercepted by regional group communication server 120. The group call setup function 122 may be configured to intercept a call in which a target is scheduled to be or actually is a participant, or is likely to be a participant based on call history, and to setup a monitoring session for intercepting call data and signaling. The intercept functionality may include, for example, adding LEA 140 as a party to the call without knowledge of the other members of the group call. The group call setup function 122 may also be configured to notify the group call host function 124 that a group call has been established, the group including at least one target. Group call host function 124 may be configured to determine that a target has joined the call, to collect, aggregate, and sequence the intercepted information, and to forward the information to regional lawful intercept server 126. Regional lawful intercept server 126 may be configured to query LEA 140 to determine whether the LEA wishes to receive data obtained before a target has joined a call or after the target has left the call, and to translate the intercepted messages into a format accessible by the LEAs 140.

Figure 2A:
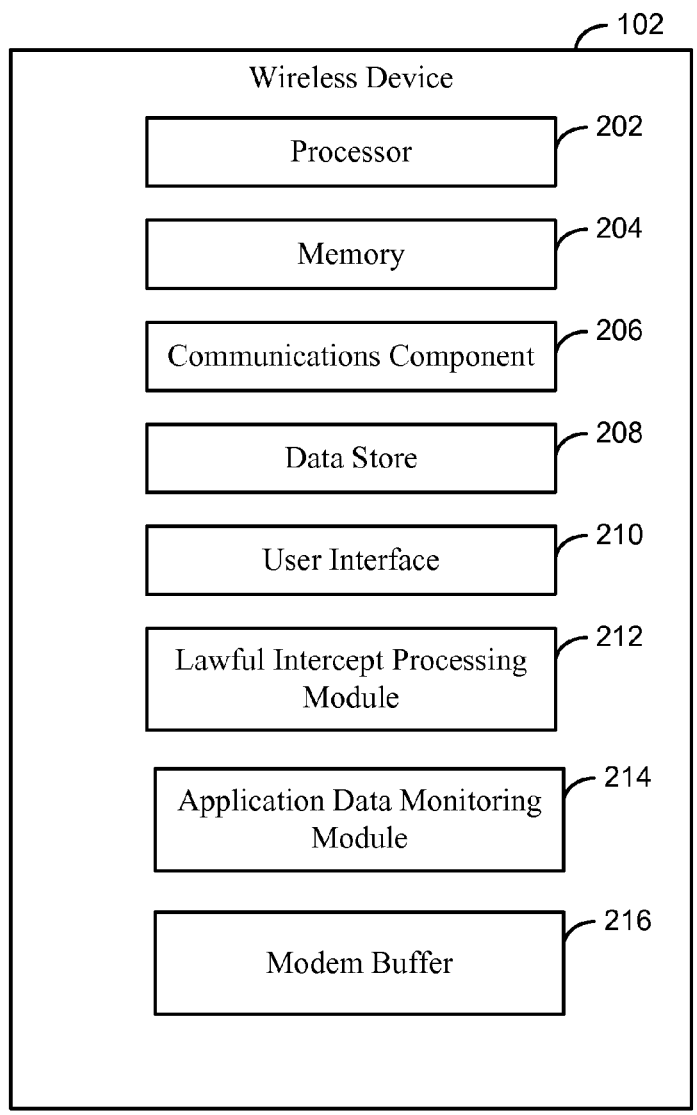
FIG. 2A depicts a wireless device, in accordance with some disclosed aspects.

FIG. 2A depicts a wireless device, such as wireless device 102, depicted in FIG. 1. Wireless devices 104 and 106 may each include the same or similar components. Wireless device 102 may include a processor 202 for carrying out processing functions associated with one or more of components and functions described herein. Processor 202 can include a single or multiple set of processors or multi-core processors. Moreover, processor 202 can be implemented as an integrated processing system and/or a distributed processing system.

Wireless device 102 further includes a memory 204, such as for storing data used herein and/or local versions of applications being executed by processor 202. Memory 204 can include any type of memory usable by a computer, such as random access memory (RAM), read only memory (ROM), tapes, magnetic discs, optical discs, volatile memory, non-volatile memory, and any combination thereof.

Further, wireless device 102 may include a communications component 206 that provides for establishing and maintaining communications with one or more parties utilizing hardware, software, and services as described herein. Communications component 206 may carry communications between components on wireless device 102, as well as between wireless device 102 and external devices, such as devices located across a communications network and/or devices serially or locally connected to wireless device 102. For example, communications component 206 may include one or more buses, and may further include transmit chain components and receive chain components associated with a transmitter and receiver, respectively, operable for interfacing with external devices.

Additionally, wireless device 102 may further include a data store 208, which can be any suitable combination of hardware and/or software, that provides for mass storage of information, databases, and programs employed in connection with aspects described herein. For example, data store 208 may be a data repository for applications not currently being executed by processor 202.

Wireless device 102 may additionally include a user interface component 210 operable to receive inputs from a user of wireless device 102, and further operable to generate outputs for presentation to the user. User interface component 210 may include one or more input devices, including but not limited to a keyboard, a number pad, a mouse, a touch-sensitive display, a navigation key, a function key, a microphone, a voice recognition component, a camera, and/or any other mechanism capable of receiving an input from a user, or any combination thereof. Further, user interface component 210 may include one or more output devices, including but not limited to a display, a speaker, a haptic feedback mechanism, a printer, any other mechanism capable of presenting an output to a user, or any combination thereof.

Additionally, in some aspects, wireless device 102 may include lawful intercept processing module 212 configured to bundle location information, signaling, voice call data and/or any other information subject to lawful intercept, and to provide this information to a regional group communications server, such as regional group communication server 120, depicted in FIG. 1. According to some aspects, the lawful intercept processing module 212 provides location information, via signaling, when a call is first initiated and each time the device changes location. Wireless device 102 may further include an application monitoring module 214 configured to monitor applications accessed by a user of the device while participating in the group call. For example, application data monitoring module 214 may monitor an email application, web browsers, text messaging applications, and/or any other application access by the user while on the call. When application data monitoring module 214 detects that an application has been accessed application data monitoring module 214 may access modem buffer 216 to capture data associated with the access.

Figure 2B:
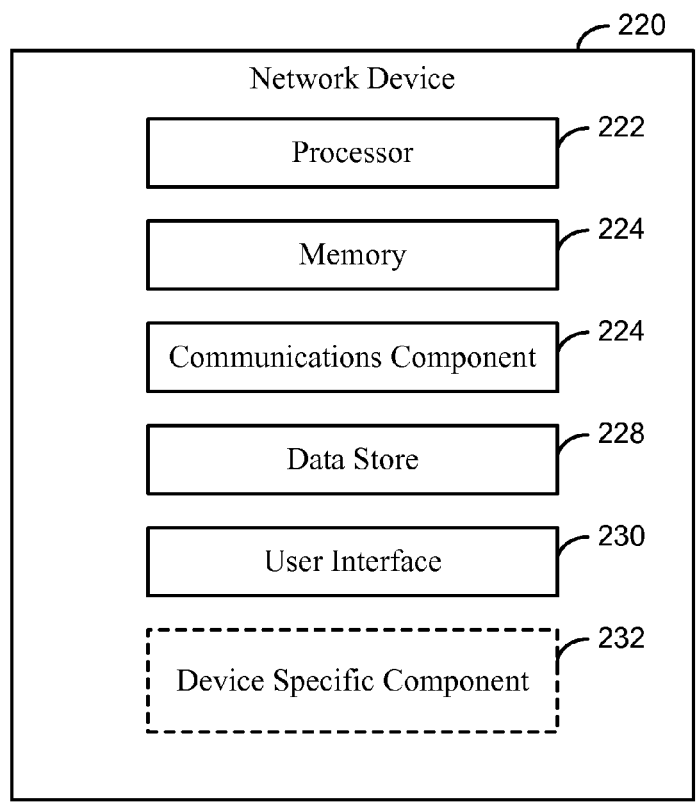
FIG. 2B depicts a network device, in accordance with some disclosed aspects.

FIG. 2B depicts a network device 220. Network device 220 may represent, for example, LAC 150, group call setup function 122, group call host function 124, and/or regional lawful intercept server 126. Network device 220 may include a processor 222, memory 224, communications component 226, data store 228, and user interface 230. These components operate in a manner similar to the corresponding components of wireless device 102, and further description will not be provided. Network device 220 may also include one or more device specific components 232 for performing specific functions of the specific network device.

Figure 3:
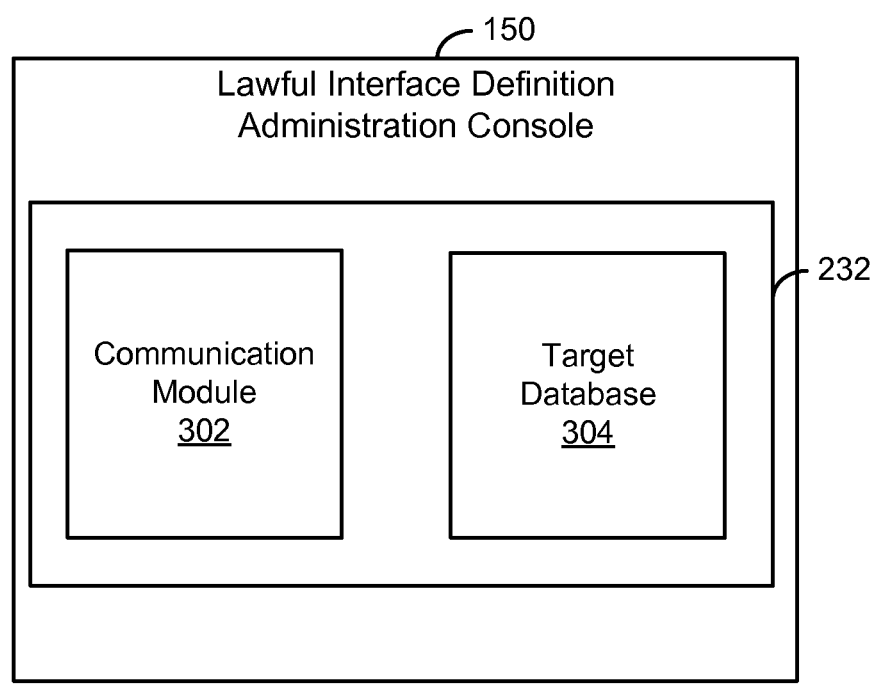
FIG. 3 depicts a lawful intercept definition administration console, in accordance with some disclosed aspects.

FIG. 3 depicts LAC 150 in greater detail. LAC 150 may include a device specific component 232 that includes a communication module 302 configured to receive lawful authorizations to perform call intercept functions. Communication module 302 may further be configured to provide target information to core lawful intercept server 130. Information may include, for example, the target name, mobile phone number, target priority, etc. Device specific component 232 may also include a target database 304 that stores information about each target to be monitored.

Figure 4:
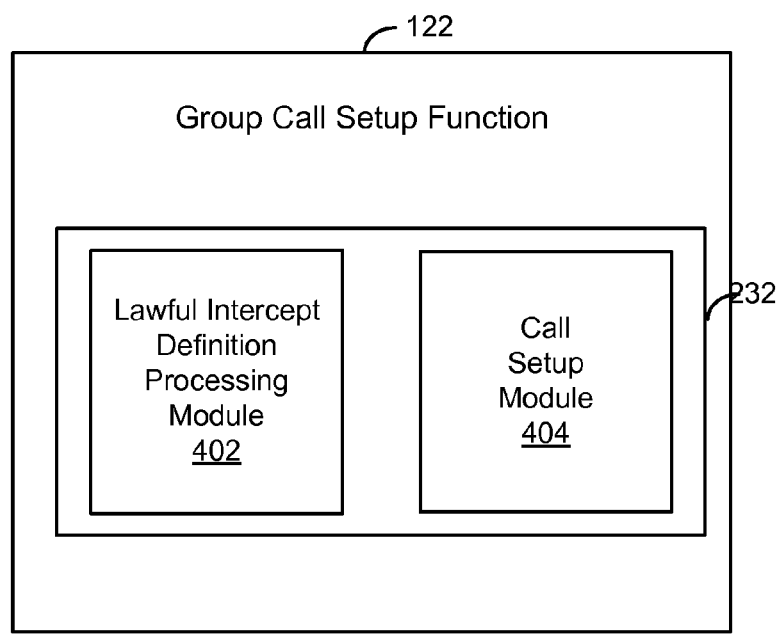
FIG. 4 depicts a regional group call setup function, in accordance with some disclosed aspects.

Turning now to FIG. 4, regional group call setup function (RGCSF) 122 is shown in greater detail. RGCSF 122 may include a device specific component 232 that includes a lawful intercept definition processing module 402 and a call setup module 404. Lawful intercept definition processing module 402 may be configured to receive lawful intercept definitions from LAC 150. Using this information, lawful intercept definition processing module 402 may be configured to determine whether a monitoring target is a member of a planned group call. Lawful intercept definition processing module 402 may also be configured to determine whether a target who is not a member of the planned group call is likely to join the group call based on previous communication history. For example, RGCSF 122 may maintain a historical database of previous calls and the parties involved. Lawful intercept definition processing module 402 may be configured to determine whether a target has previously participated in a call with one or more members of the planned group call. In some aspects, lawful intercept definition processing module 402 may determine whether the target has communicated with a known associate of at least one member of the planned group. These determinations may be used by the group call host function 124 to determine whether to store call content. Lawful intercept definition processing module 402 may also be configured to collect initial signaling data associated with establishing a group call. Call setup module 404 may be configured to setup the group call for monitoring. This may include, for example, receiving the call request, and adding the LEA 140 as a party to the call without the knowledge of the members of the group call.

Figure 5:
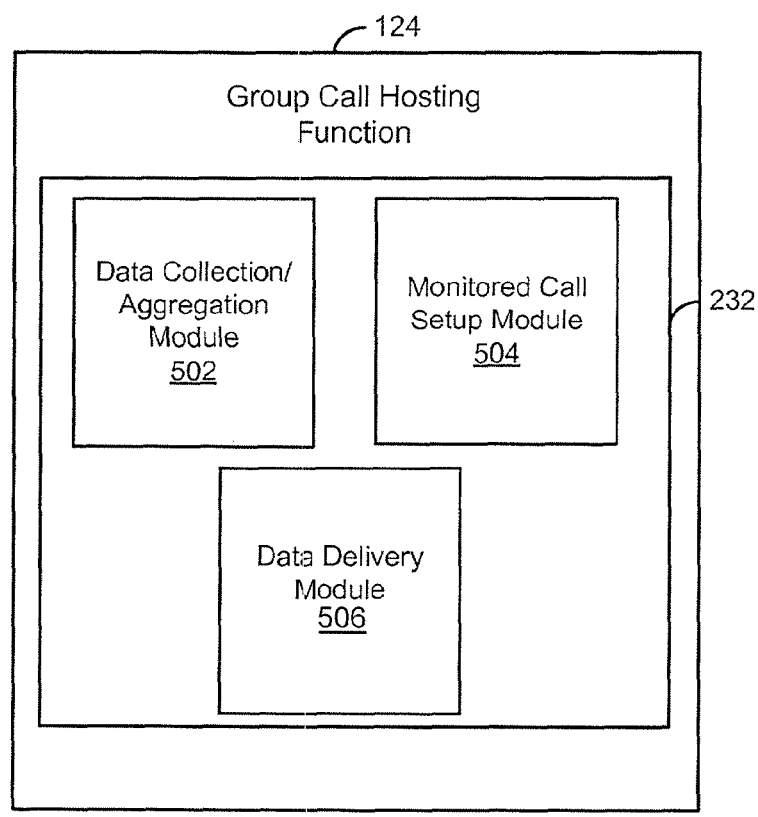
FIG. 5 depicts a regional group call host function, in accordance with some disclosed aspects.

FIG. 5 illustrates regional group call host function 124 in greater detail. A device specific component 232 including data collection/aggregation module 502 may be provided for intercepting data from a mobile device, such as signaling information and media, and aggregating the intercepted data prior to providing the data to the LEA. Data collection/aggregation module 502 may be configured to correlate intercepted data such that signaling and the corresponding voice components are delivered to the LEA together and in the order of receipt. In some aspects, regional group call host function 124 may collect data exchanged prior to the target joining the call and/or after the target has left the call. In some aspects, the collected data includes not only signaling and data related to the voice communications during the group call, but also data related to other applications accessed by the target while participating in the group call. In some aspects, data collected before the target has joined the call or after the target has left call, as well as non-voice-call application data collected by regional group call host function 124 may be delivered to regional lawful intercept server 126, for forwarding to a LEA, upon request from the regional lawful intercept server. In other aspects, this data is always transmitted to regional lawful intercept server 126. Monitored call setup module 504 may be configured to determine whether a monitoring target has joined the call. Device specific component 232 may also include a data delivery module 506 for providing intercepted data to a lawful intercept server, such as regional lawful intercept server 126.

Figure 6:
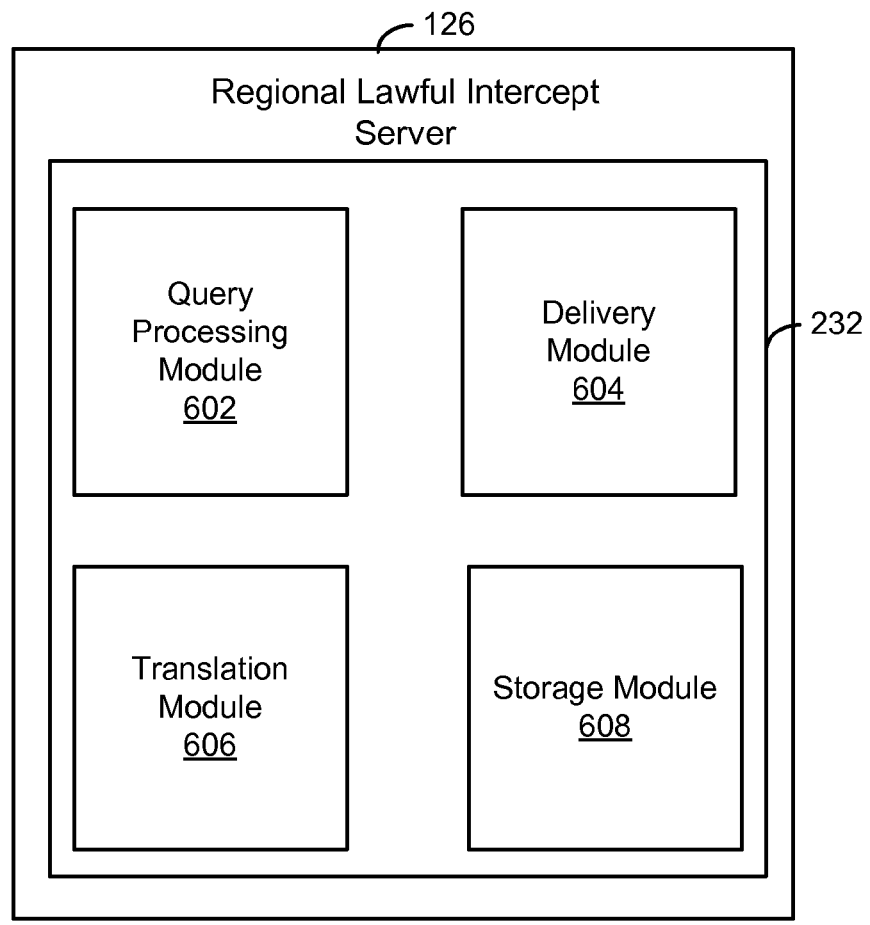
FIG. 6 depicts a regional lawful intercept server, in accordance with some disclosed aspects.

FIG. 6 depicts regional lawful intercept server 126 in further detail. Regional lawful intercept server 126 acts as a gateway between the regional group communication server and one or more LEAs. Regional lawful intercept server 126 may include a device specific component 232 that includes a query processing module 602 for determining whether a LEA desires to receive information relating to the group call that was collected by regional group call host function 124 before the target joined the call and/or after the target left the group call. Query processing module 602 may further be configured to determine if the LEA desires to receive data related to other applications accessed by the target while participating in the group call. Device specific component 232 may also include a delivery module 604 for delivering intercepted information received from the regional group call host function 124 to a LEA. In some aspects, delivery module 604 may be configured to request, from regional group call host function 124, data collected prior to a target joining the group call and/or after the target has left the group call, as well as data related to other applications accessed by the target while participating in the group call, in the event the LEA has requested such information and if regional group call host function 124 has not previously delivered such information to regional lawful intercept server 126. Device specific component 232 may also include a translation module 606 for translating intercepted data into a format accessible by LEAs. In addition, device specific component may include a storage module 608 for storing intercepted data prior to delivering the data to the LEA. For example, in a case wherein the LEA is unable to receive data in real-time, the data may be buffered at regional lawful intercept server 126 until such time as the data can be delivered.

Figure 7:
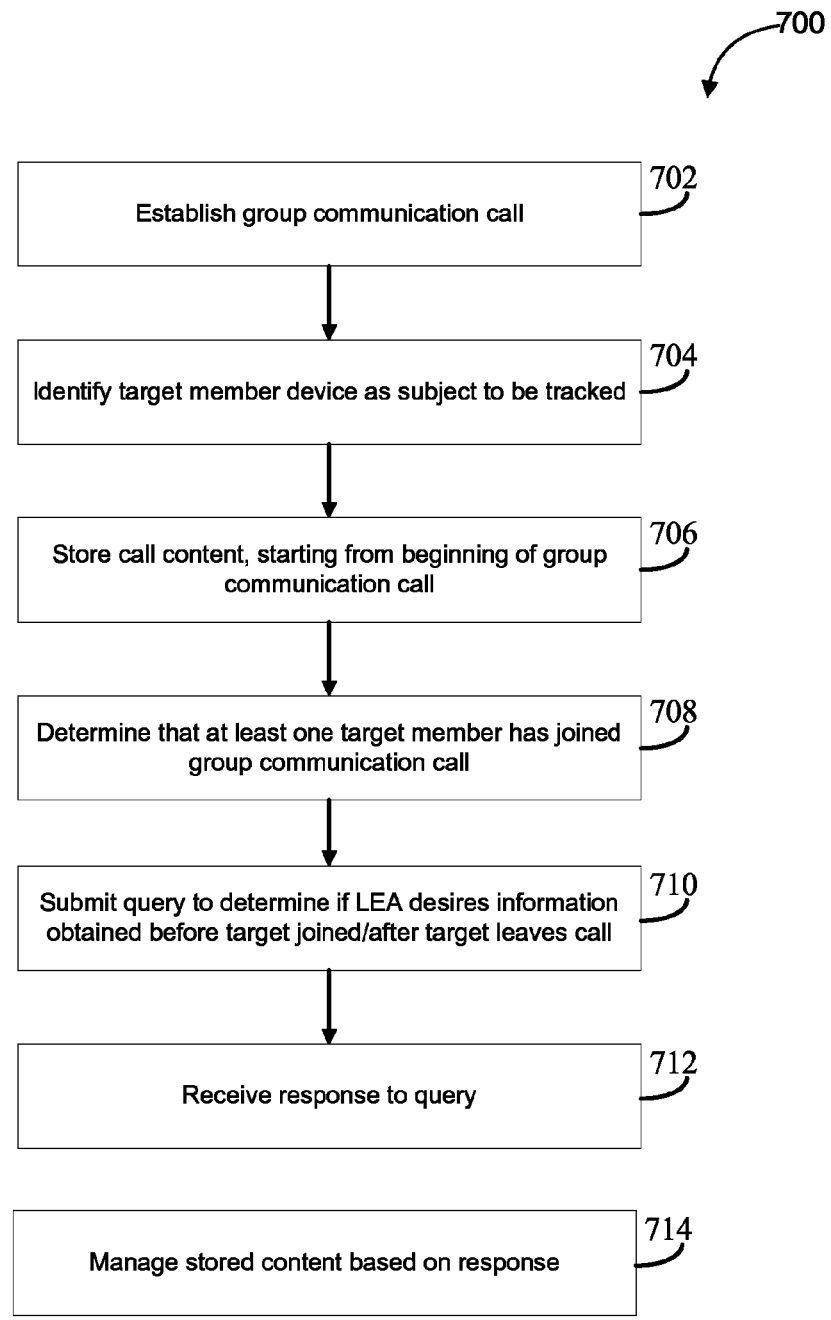
FIG. 7 depicts an aspect of a method for reporting call information, in accordance with some disclosed aspects.

FIG. 7 depicts one aspect of an exemplary method 700 for reporting call information in a group communication call. As depicted at 702, a group communication call for a call group having a plurality of member devices may be established. As depicted at 704, at least one target member device of the plurality of member devices may be identified as corresponding to a subject to be tracked. As depicted at 706, call content for communications corresponding the call may be stored, starting from the beginning of the group communication call. As depicted at 708, a determination may be made that at least one target member device has joined the group call. As depicted at 710, based on the at least one target member joining the call, a query may be forwarded to determine if a law enforcement agency desires information relating to the group call obtained before the at least one member device joined the group call or after the at least one target member device leaves the call. As depicted at 712, a response to the query may be received, and as depicted at 714, the stored content may be managed based on the response.

Figure 8:
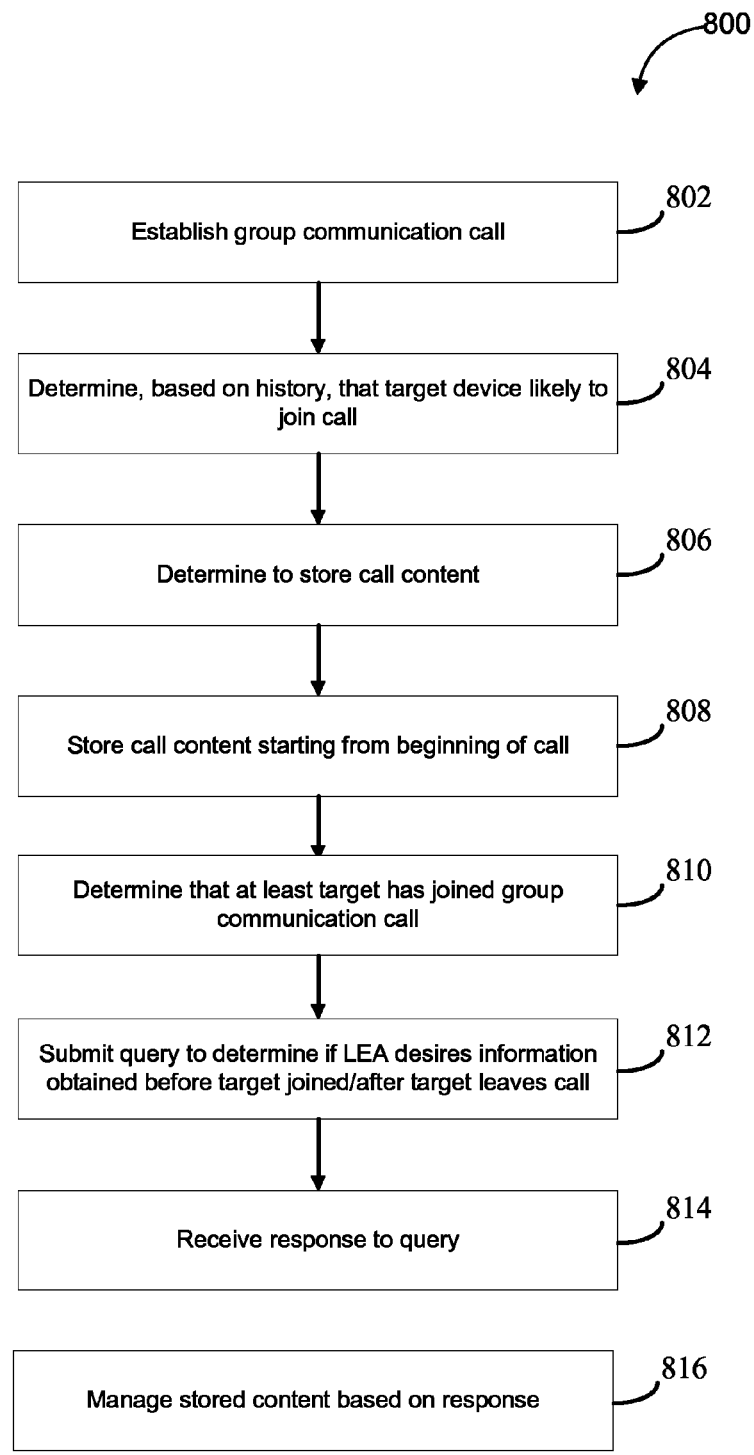
FIG. 8 depicts another aspect of a method for reporting call information, in accordance with some disclosed aspects.

FIG. 8 depicts one aspect of an exemplary method 800 for reporting call information in a group communication call. As depicted at 802, a group communication call for a call group having a plurality of member devices may be established. As depicted at 804, a determination is made, based on call history, that a target device is likely to join the group communication call, wherein the target device is not a member of the call group. As depicted at 806, a determination is made to store call content for communications corresponding to the group call based on determining that the target device is likely to join the group communication call. As depicted at 808, call content for communications corresponding to the call may be stored, starting from the beginning of the group communication call. As depicted at 810, a determination may be made that at least one target member device has joined the group call. As depicted at 812, based on the at least one target member joining the call, a query may be forwarded to determine if a law enforcement agency desires information relating to the group call obtained before the at least one member device joined the group call or after the at least one target member device leaves the call. As depicted at 816, a response to the query may be received, and as depicted at 816, the stored content may be managed based on the response.

Figure 9:
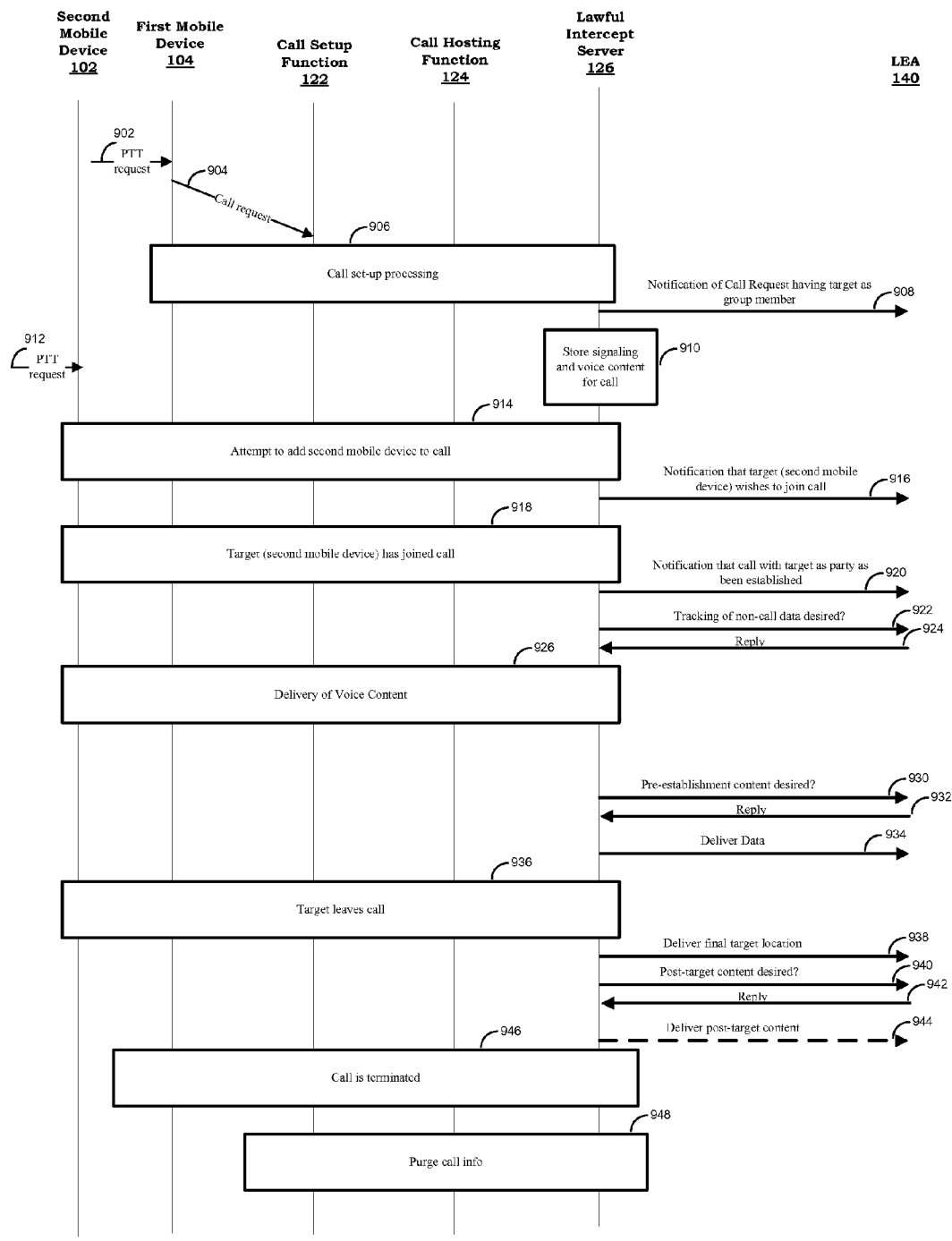
FIG. 9 depicts an aspect of a message flow exchange, in accordance with some disclosed aspects.

FIG. 9 depicts one aspect of an exemplary message flow showing an exchange of messages among a first wireless device 104, a regional group call setup function 122, a regional group call host function 124, a second wireless device 102, a regional lawful intercept server 126, and a law enforcement authority 140. In this exemplary message flow, first wireless device 104 is a wireless device that is participant in a group call, but is not a target for monitoring; second wireless device 102 is a participant in the group call that is a target for monitoring.

As shown at 902, a user of first wireless device 104 may issue a PTT request to initiate a group call. While first wireless device 104, which is not a target for monitoring, initiates the call in this example, second wireless device 102, which is a target for monitoring, can initiate the call. The call request is routed to regional group call setup function 122, as shown at 904. First wireless device 104, regional group call setup function 122 may perform call processing steps, group call host function 124, and regional lawful intercept server 126 may perform steps to establish the group call. As depicted at 908, lawful intercept server 126 may notify LEA 140 that a call request having a target as a group member has been received and is being processed.

As depicted at 910, lawful intercept server 126 may store call content. The content may be received from regional group call host function 124 and may include, for example, call signaling, voice content, media content, etc. As depicted at 912, second wireless device 102 may issue a PTT request. The request may be, for example, an acknowledgment of the request transmitted by first wireless device 104. The request may indicate a desire to join the group call. As depicted at 914, second wireless device 102, first wireless device 104, call setup function 122, group call host function 124, and regional lawful intercept server 126 may perform steps to add second mobile device to the group call, and LEA 140 may be notified of the desire of second wireless device 102 to join the call, as shown at 916.

Once the second wireless device 102 has joined the call, as depicted at 918, the LEA 140 may be notified that a call having a target (second wireless device 102) has been established. Regional lawful intercept server 126 may then submit a query to LEA 140 to determine whether LEA 140 desires to track non-call data, as shown at 922, and LEA replies accordingly, as depicted at 924. As depicted at 926, as the call progresses, call content data is collected. As shown at 930, prior to delivering content to LEA 140, regional lawful intercept server 126 may transmit a query to LEA 140 to determine whether the LEA wishes to received content stored prior to establishing a call with the target (second wireless device 102), and LEA 140 replies accordingly, as depicted at 932. Regional lawful intercept server 126 may then deliver call content to LEA 140 based on the received reply. For example, if LEA 140 replies that it wishes to receive content stored prior to establishing a call with the target, regional lawful intercept server 126 would provided all stored content. If LEA 140 has replied that it does not wish to receive such content, only content stored after establishing the call with the target is forwarded to LEA 140.

As depicted at 936, the target (second wireless device 102) leaves the call. Regional lawful intercept server 126 may then deliver target location information to the LEA, as shown at 938, and may query LEA 140 to determine whether the LEA wishes to receive content collected after the target has left the call, as shown at 940. LEA 140 replies accordingly, as shown at 942, and if the reply indicates that LEA 140 wishes to receive content collected after the target has left the call, such content is delivered to the LEA, as shown at 944. As shown at 946, the call is terminated, and upon termination of the call, all stored information related to the group call is purged, as shown at 948.

Figure 10:
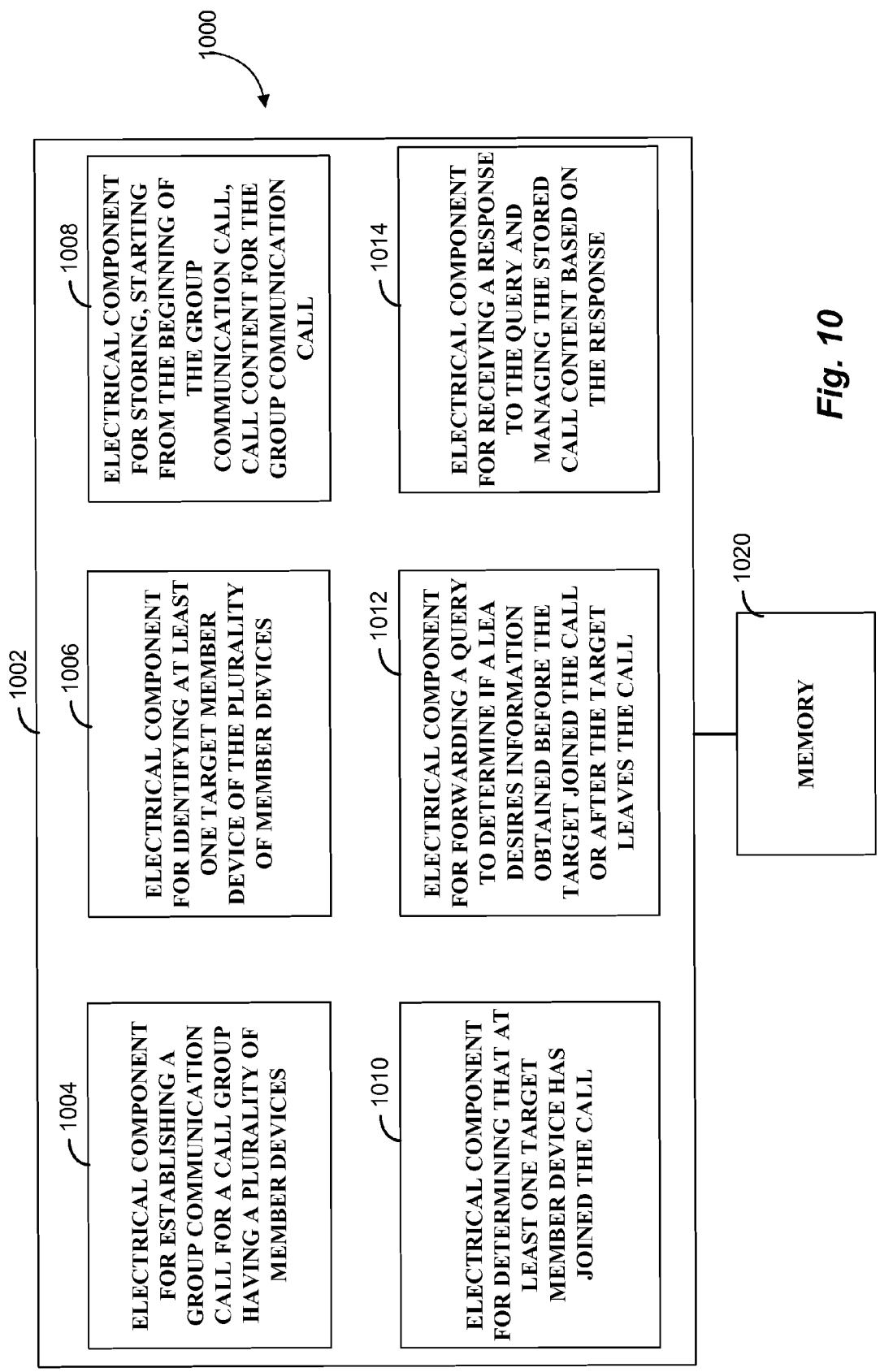
FIG. 10 depicts a system for reporting call information, in accordance with some disclosed aspects.

With reference to FIG. 10, illustrated is a system 1000 for reporting call information. For example, system 1000 can reside at least partially within a group communications server, such as regional group communication server 120

(FIG. 1). It is to be appreciated that system 1000 is represented as including functional blocks, which can be functional blocks that represent functions implemented by a computing platform, processor, software, or combination thereof such as firmware. System 1000 includes a logical grouping 1002 of electrical components that can act in conjunction. For instance, logical grouping 1002 can include an electrical component 1004 for establishing a group communication call for a call group having a plurality of member devices. Moreover, logical grouping 1002 can include an electrical component 1006 for identifying at least one target member device of the plurality of member devices as corresponding to a subject to be tracked. Further, logical grouping 1002 can include an electrical component 1008 for storing, starting from the beginning of the group communication call, call content for communications to the group call. In addition, logical grouping 1002 can include an electrical component 1010 for determining that the at least one target member device has joined the group call. Additionally, logical grouping 1002 can include an electrical component 1012 for forwarding a query to determine if a law enforcement agency desires information relating to the group call obtained before the at least one target member device joined the call or after the at least one target member device leaves the group call. The logical grouping 1002 may also include an electrical component 1014 for receiving a response to the query and managing the call content based on the response. System 1000 can include a memory 1020 that retains instructions for executing functions associated with electrical components 1004-1014. While shown as being external to memory 1020, it is to be understood that one or more of electrical components 1004-1014 can exist within memory 1020.

Figure 11:
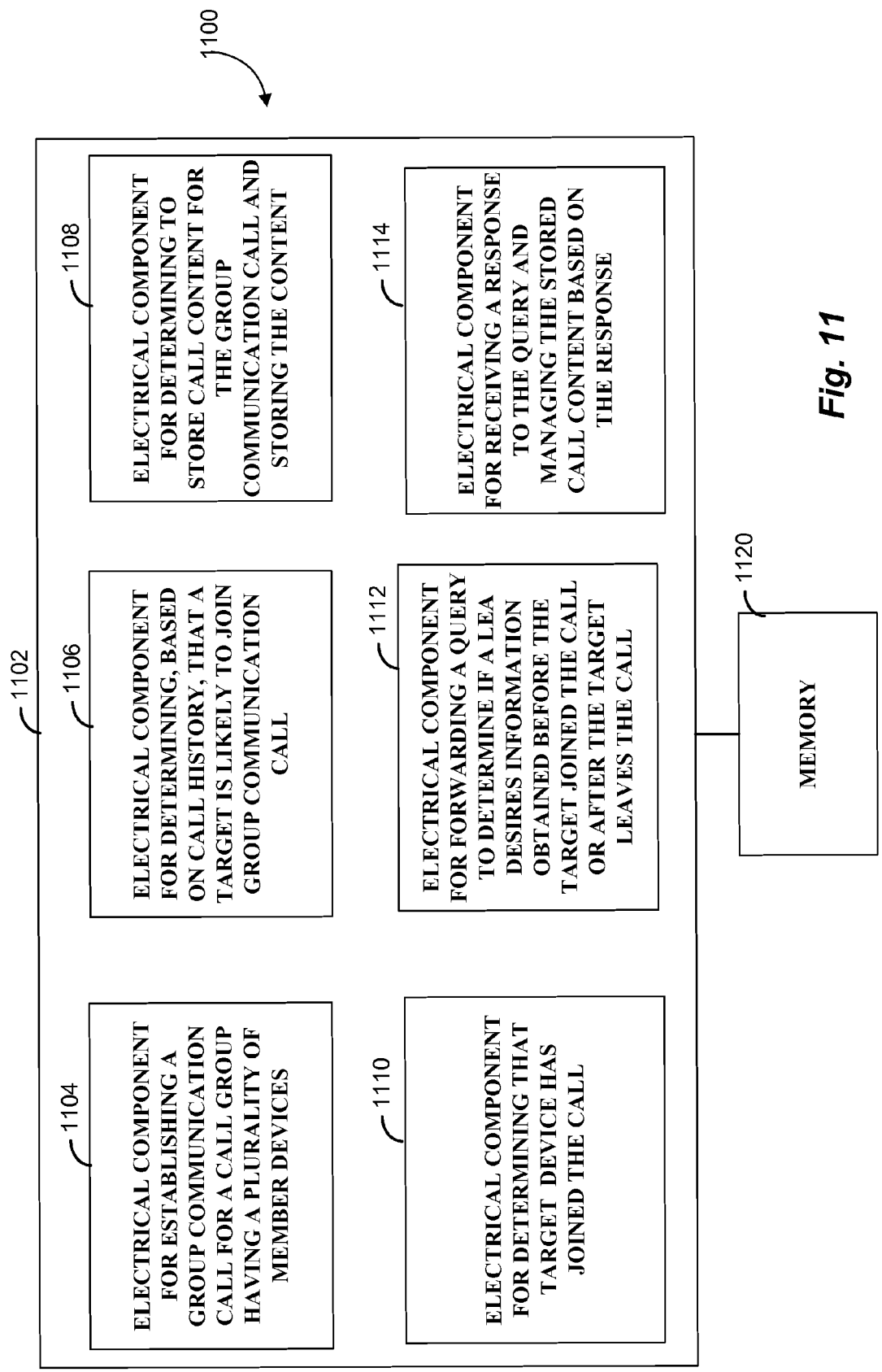
FIG. 11 depicts another system for reporting call information, in accordance with some disclosed aspects.

FIG. 11 depicts another system 1100 for reporting call information. For example, system 1100 can reside at least partially within a group communications server, such as regional group communications server 120 (FIG. 1). It is to be appreciated that system 1100 is represented as including functional blocks, which can be functional blocks that represent functions implemented by a computing platform, processor, software, or combination thereof such as firmware. System 1100 includes a logical grouping 1102 of electrical components that can act in conjunction. For instance, logical grouping 1102 can include an electrical component 1104 for establishing a group communication call for a call group having a plurality of member devices. Moreover, logical grouping 1102 can include an electrical component 1106 for determining, based on call history, that a target device is likely to join the group communication call, wherein the target device is not a member of the call group. Further, logical grouping 1102 can include an electrical component 1108 for determining to store call content for communications corresponding to the group call, based on the determination that the target device is likely to join the group call, and for storing, starting from the beginning of the group communication call, call content for communications to the group call. In addition, logical grouping 1102 can include an electrical component 1110 for determining that the at least one target member device has joined the group call. Additionally, logical grouping 1102 can include an electrical component 1112 for forwarding a query to determine if a law enforcement agency desires information relating to the group call obtained before the at least one target member device joined the call or after the at least one target member device leaves the group call. The logical grouping 1102 may also include an electrical component 1114 for receiving a response to the query and managing the call content based on the response. System 1100 can include a memory 1120 that retains instructions for executing functions associated with electrical components 1104-1114. While shown as being external to memory 1120, it is to be understood that one or more of electrical components 1104-1114 can exist within memory 1120.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of reporting call information in a group communication call, comprising:
    establishing a group communication call for a call group having a plurality of member devices;
    identifying at least one target member device of the plurality of member devices as corresponding to a subject to be tracked;
    storing, starting from the beginning of the group communication call, call content for communications corresponding to the group communication call;
    determining that the at least one target member device has joined the group communication call;
    forwarding at least one query, based on the at least one target member device joining the group communication call, to determine if a law enforcement authority desires information relating to the group communication call obtained before the at least one target member device joined the group communication call or after the at least one target member device has left the group communication call;
    receiving a response to the at least one query; and
    managing the stored call content based on the response.

2. The method of claim 1, wherein the call content comprises one or more of call signaling, voice content, and media content.

3. The method of claim 1, wherein the managing comprises transmitting, to the law enforcement authority, the call content stored prior to the at least one target member device joining the group communication call or after the at least one target member device has left the group communication call when the response indicates the information is desired.

4. The method of claim 1, wherein the managing comprises deleting call signaling and voice content stored prior to the at least one target member device joining the group communication call and discontinuing the storing.

5. The method of claim 1, further comprising delivering, based on the at least one target member device joining the group communication call, group call information relating to one or more member devices in the call group.

6. The method of claim 5, wherein the group call information includes one or more of identification of a member device or a corresponding user corresponding to the call group, floor arbitration information, identification of which member device is talking, identification of a member device that joined the group communication call, identification of a member device that left the group communication call, and voice packets.

7. The method of claim 1, wherein the at least one query comprises a first query to determine if the law enforcement authority desires information relating to the group communication call obtained before the at least one target member device joined the group communication call and a second query to determine if the law enforcement authority desires after information relating to the group communication call obtained after the at least one target member device has left the group communication call, the method further comprising:
   determining that the at least one target member device has left the group communication call;
   forwarding the second query, based on the at least one target member device leaving the group communication call.

8. The method of claim 1, further comprising transmitting non-group communication call information collected from the at least one target member device to the call intercept component.

9. The method of claim 8, wherein the non-group communication call information comprises data call information different from the call signaling and the voice content for communications corresponding to the group communication call.

10. The method of claim 8, wherein the non-group communication call information comprises data related to one or more applications accessed on the target member device after joining the group communication call.

11. The method of claim 1, further comprising transmitting, to the law enforcement authority, the call content stored subsequent to the at least one target member device joining the group communication call.

12. The method of claim 1, further comprising deleting the call content for communications corresponding to the group communication call upon completion of the group communication call.

13. A network apparatus for reporting call information in a group communication call, comprising:
   a group communication setup component configured to establish a group communication call for a call group having a plurality of member devices; and
   a call intercept component configured to:
      identify at least one target member device of the plurality of member devices as corresponding to a subject to be tracked;
      store, starting from the beginning of the group communication call, call content for communications corresponding to the group communication call;
      determine that the at least one target member device has joined the group communication call;
      forward a query, based on the at least one target member device joining the group communication call, to determine if a law enforcement authority desires information relating to the group communication call obtained before the at least one target member device joined the group communication call or after the at least one target member device has left the group communication call;
      receive a response to the query; and
      manage the stored call content based on the response.

14. The network apparatus of claim 13, wherein the call content comprises one or more of call signaling, voice content, and media content.

15. The network apparatus of claim 13, wherein the managing comprises transmitting, to the law enforcement authority, the call content stored prior to the at least one target member device joining the group communication call or after the at least one target member device has left the group communication call when the response indicates the information is desired.

16. The network apparatus of claim 13, wherein the managing comprises deleting call signaling and voice content stored prior to the at least one target member device joining the group communication call and discontinuing the storing.

17. The network apparatus of claim 13, wherein the call intercept component is further configured to deliver, based on the at least one target member joining the group communication call, group call information relating to one or more member devices in the group communication call.

18. The network apparatus of claim 17, wherein the group call information includes one or more of identification of a member device or a corresponding user corresponding to the call group, floor arbitration information, identification of which member device is talking, identification of a member device that joined the group communication call, identification of a member device that left the group communication call, and voice packets.

19. The network apparatus of claim 13, wherein the at least one query comprises a first query to determine if the law enforcement authority desires information relating to the group communication call obtained before the at least one target member device joined the group communication call and a second query to determine if the law enforcement authority desires after information relating to the group communication call obtained after the at least one target member device has left the group communication call, and wherein the call intercept component is further configured to:
   determine that the at least one target member device has left the group communication call; and
   forward the second query, based on the at least one target member device leaving the group communication call.

20. The network apparatus of claim 13, wherein the call intercept component is further configured to transmit non-group communication call information collected from the at least one target member device to the call intercept component.

21. The network apparatus of claim 20, wherein the non-group communication call information comprises data call information different from the call signaling and the voice content for communications corresponding to the group communication call.

22. The network apparatus of claim 20, wherein the non-group communication call information comprises data related to one or more applications accessed on the target member device after joining the group communication call.

23. The network apparatus of claim 13, wherein the call intercept component is further configured to transmit, to the law enforcement authority, the call content stored subsequent to the at least one target member device joining the group communication call.

24. The network apparatus of claim 13, wherein the call intercept component is further configured to delete the call content for communications corresponding to the group communication call upon completion of the group communication call.

25. At least one processor configured to report call information in a group communication call, comprising:
    a first module for establishing a group communication call for a call group having a plurality of member devices;
    a second module for identifying at least one target member device of the plurality of member devices as corresponding to a subject to be tracked;
    a third module for storing, starting from the beginning of the group communication call, call content for communications corresponding to the group communication call;
    a fourth module for determining that the at least one target member device has joined the group communication call;
    a fifth module for forwarding at least one query, based on the at least one target member device joining the group communication call, to determine if a law enforcement authority desires information relating to the group communication call obtained before the at least one target member device joined the group communication call or after the at least one target member device has left the group communication call;
    a sixth module for receiving a response to the at least one query; and
    a seventh module for managing the stored call content based on the response.

26. A computer program product, comprising:
    a non-transitory computer-readable medium comprising:
        a first set of codes for causing a computer to establish a group communication call for a call group having a plurality of member devices;
        a second set of codes for causing the computer to identify at least one target member device of the plurality of member devices as corresponding to a subject to be tracked;
        a third set of codes for causing the computer to store, starting from the beginning of the group communication call, call content for communications corresponding to the group communication call;
        a fourth set of codes for causing the computer to determine that the at least one target member device has joined the group communication call;
        a fifth set of codes for causing the computer to forward at least one query, based on the at least one target member device joining the group communication call, to determine if a law enforcement authority desires information relating to the group communication call obtained before the at least one target member device joined the group communication call or after the at least one target member device has left the group communication call;
        a sixth set of codes for causing the computer to receive a response to the at least one query; and
        a seventh set of codes for causing the computer to manage the stored call content based on the response.

27. An apparatus, comprising:
    means for establishing a group communication call for a call group having a plurality of member devices;
    means for identifying at least one target member device of the plurality of member devices as corresponding to a subject to be tracked;
    means for storing, starting from the beginning of the group communication call, call content for communications corresponding to the group communication call;
    means for determining that the at least one target member device has joined the group communication call;
    means for forwarding at least one query, based on the at least one target member device joining the group communication call, to determine if a law enforcement authority desires information relating to the group communication call obtained before the at least one target member device joined the group communication call or after the at least one target member device has left the group communication call;
    means for receiving a response to the at least one query; and
    means for managing the stored call content based on the response.

28. A method for reporting call information in a group communication call, comprising:
    establishing the group communication call for a call group having a plurality of member devices;
    determining, based on call history, that a target device is likely to join the group communication call, wherein the target device is not a member of the call group;
    determining to store call content for communication corresponding to the group communication call, based in part on the determination that the target device is likely to join the group communication call;
    storing, starting from the beginning of the group communication call, call content for communications corresponding to the group communication call;
    determining that the target device has joined the group communication call;
    forwarding at least one query, based on the target device joining the group communication call, to determine if a law enforcement authority desires information relating to the group communication call obtained before the target device joined the group communication call or after the target device has left the group communication call;
    receiving a response to the at least one query; and
    managing the stored call content based on the response.

29. The method of claim 28, wherein determining that a target device is likely to join the group communication call based on call history comprises:
    determining that the target device has previously communicated with at least one member of the call group.

30. The method of claim 28, further comprising:
    determining a priority level associated with the target device, wherein
    determining to store call content for communication corresponding to the group communication call comprises determining to store call content based on the priority level.

31. The method of claim 30, wherein the target device has a high priority level, and wherein determining to store call content for communication corresponding to the group communication call comprises determining whether the target device has previously communicated with a known associate of a least one member of the call group.

32. The method of claim 28, wherein determining that the target device has joined the group communication call comprises determining that the target devices has acknowledged the group communication call but a communication channel has not been established.

33. An apparatus for reporting call information in a group communication call, comprising:
a group communication setup component configured to establish the group communication call for a call group having a plurality member devices; and
a call intercept component configured to:
determine, based on call history, that a target device is likely to join the group communication call, wherein the target device is not a member of the call group;
determine to store call content for communication corresponding to the group communication call, based in part on the determination that the target device is likely to join the group communication call;
store, starting from the beginning of the group communication call, call content for communications corresponding to the group communication call;
determine that the target device has joined the group communication call;
forward at least one query, based on the target device joining the call, to determine if a law enforcement agency desires information relating to the group call obtained before the target device joined the call or after the target device has left the call;
receive a response to the at least one query; and
manage the stored call content based on the response.

34. The apparatus of claim 33, wherein call intercept component is further configured to determine that the target device has previously communicated with at least one member of the call group.

35. The apparatus of claim 33, wherein the call intercept component is further configured to determine a priority level associated with the target device, and to store call content based on the priority level.

36. The apparatus of claim 35, wherein the target device has a high priority level, and wherein determining to store call content for communication corresponding to the group communication call comprises determining whether the target device has previously communicated with a known associate of a least one member of the call group.

37. The apparatus of claim 33, wherein determining that the target device has joined the group communication call comprises determining that the target devices has acknowledged the group communication call but a communication channel has not been established.

38. At least one processor configured to report call information in a group communication call, comprising:
a first module for establishing a group communication call for a call group having a plurality of member devices;
a second module for determining, based on call history, that a target device is likely to join the group communication call, wherein the target device is not a member of the call group;
a third module for determining to store call content for communication corresponding to the group communication call, based in part on the determination that the target device is likely to join the group communication call;
a fourth module for storing, starting from the beginning of the group communication call, call content for communications corresponding to the group communication call;
a fifth module for determining that the target device has joined the group communication call;
a sixth module for forwarding at least one query, based on the target device joining the group communication call, to determine if a law enforcement authority desires information relating to the group communication call obtained before the target device joined the group communication call or after the target device has left the group communication call;
a seventh module for receiving a response to the at least one query; and
an eighth module for managing the stored call content based on the response.

39. A computer program product, comprising:
a non-transitory computer-readable medium comprising:
a first set of codes for causing a computer to establish a group communication call for a call group having a plurality of member devices;
a second set of codes for causing the computer to determine, based on call history, that a target device is likely to join the group communication call, wherein the target device is not a member of the call group;
a third set of codes for causing the computer to determine to store call content for communication corresponding to the group communication call, based in part on the determination that the target device is likely to join the group communication call;
a fourth set of codes for causing the computer to store, starting from the beginning of the group communication call, call content for communications corresponding to the group communication call;
a fifth set of codes for causing the computer to determine that the target device has joined the group communication call;
a sixth set of codes for causing the computer to forward at least one query, based on the target device joining the group communication call, to determine if a law enforcement authority desires information relating to the group communication call obtained before the target device joined the group communication call or after the target device has left the group communication call;
a seventh set of codes for causing the computer to receive a response to the at least one query; and
an eighth set of codes for causing the computer to manage the stored call content based on the response.

40. An apparatus, comprising:
means for establishing a group communication call for a call group having a plurality of member devices;
means for determining, based on call history, that a target device is likely to join the group communication call, wherein the target device is not a member of the call group;
means for determining to store call content for communication corresponding to the group communication call, based in part on the determination that the target device is likely to join the group communication call;
means for storing, starting from the beginning of the group communication call, call content for communications corresponding to the group communication call;
means for determining that the target device has joined the group communication call;
means for forwarding at least one query, based on the target device joining the group communication call, to determine if a law enforcement authority desires information relating to the group communication call obtained before the target device joined the group communication call or after the target device has left the group communication call;

means for receiving a response to the at least one query; and means for managing the stored call content based on the response.

* * * * *